United States Patent [19]

Solhjell

[11] Patent Number: 5,542,082
[45] Date of Patent: Jul. 30, 1996

[54] DATA STORAGE SYSTEM CONNECTED TO A HOST COMPUTER SYSTEM AND HAVING REMOVABLE DATA STORAGE MEDIA AND EQUIPPED TO READ A CONTROL PROGRAM FROM THE REMOVABLE MEDIA INTO STORAGE EMPLOYING ID COMPARISON SCHEME

[75] Inventor: Erik Solhjell, Oslo, Norway

[73] Assignee: Tandberg Data A/S, Oslo, Norway

[21] Appl. No.: 523,746

[22] Filed: Sep. 5, 1995

Related U.S. Application Data

[63] Continuation of Ser. No. 116,810, Sep. 7, 1993, abandoned, which is a continuation of Ser. No. 622,948, Dec. 6, 1990, abandoned.

[51] Int. Cl.$^6$ .............................. G06F 12/00; G06F 9/445
[52] U.S. Cl. ...................... 395/442; 395/833; 395/700; 364/DIG. 1; 364/280.2; 364/236.6
[58] Field of Search ...................................... 395/700, 442, 395/833, 430, 438, 492

[56] References Cited

U.S. PATENT DOCUMENTS

| | | | |
|---|---|---|---|
| 4,199,809 | 4/1980 | Pasahow et al. | 370/110.2 |
| 4,430,704 | 2/1984 | Page et al. | 395/700 |
| 4,481,578 | 11/1984 | Hughes et al. | 395/200.07 |
| 4,538,224 | 8/1985 | Peterson | 395/842 |
| 4,590,557 | 5/1986 | Lillie | 395/700 |
| 4,623,963 | 11/1986 | Phillips | 395/700 |
| 4,663,707 | 5/1987 | Dawson | 395/700 |
| 4,720,812 | 1/1988 | Kao et al. | 395/700 |
| 4,803,623 | 2/1989 | Klashka et al. | 395/828 |
| 4,899,136 | 2/1990 | Beard et al. | 340/706 |
| 5,068,780 | 11/1991 | Bruckert et al. | 395/700 |
| 5,083,800 | 1/1992 | Lockton | 273/439 |
| 5,093,915 | 3/1992 | Platterter et al. | 395/700 |
| 5,210,875 | 5/1993 | Bealkowski et al. | 395/700 |
| 5,237,689 | 8/1993 | Behnke | 395/700 |
| 5,307,497 | 4/1994 | Feigenbaum et al. | 395/700 |

FOREIGN PATENT DOCUMENTS

| | | |
|---|---|---|
| 2-42522 | 2/1990 | Japan . |
| 3-290873 | 12/1991 | Japan . |

OTHER PUBLICATIONS

Tandberg Data—TDC 3600 Series—Streaming Tape Cartridge Drives—Maintenance Manual—Apr., 1988.
Tandberg Data TDC 3600 Series—Streaming Tape Cartridge Drives TDC 3620/3640/3660 Reference Manual—Jun., 1988.
Microcomputer Dictionary and Guide—Sippl–Kidd, pp. 93–94, 1975.

*Primary Examiner*—Matthew M. Kim
*Attorney, Agent, or Firm*—Hill, Steadman & Simpson

[57] ABSTRACT

A data storage device has associated therewith a removable storage medium. The data storage device has a main control unit with a microprocessor. The system is designed such that an internal control program for control of the media is stored directly on the media itself. By use of a boot program which can be stored in the microprocessor or separately from the microprocessor, the control program is read off of the media by the microprocessor and is stored in a main control program storage within the data storage device. The main control program storage is an erasible storage like an EEPROM, RAM, or flash memory.

5 Claims, 2 Drawing Sheets

DATA STORAGE SYSTEM CONNECTED TO A HOST COMPUTER SYSTEM AND HAVING REMOVABLE DATA STORAGE MEDIA AND EQUIPPED TO READ A CONTROL PROGRAM FROM THE REMOVABLE MEDIA INTO STORAGE EMPLOYING ID COMPARISON SCHEME

This is a continuation of application Ser. No. 08/116,810, filed Sep. 7, 1993, now abandoned, which is a continuation of application Ser. No. 07/622,948, filed Dec. 6, 1990, now abandoned.

BACKGROUND OF THE INVENTION

The present invention relates to storage devices having a removable storage media.

In the data storage field, many different types of storage media exist. Storage devices are known which have removable storage media, like magnetic tapes, optical disks, removable magnetic disks, flexible disks, etc. Although these devices differ greatly in the way they store data, the units always have some form of electronic controller built in to control the operation of the data storage process. In modern designs, these built-in control units are very often designed around one or more microprocessors. A typical prior art system is shown in FIG. 1.

The main control unit 11 (very often designed around one or more microprocessors) controls the operation of the storage device generally shown at 10. To write data on the removable storage medium 9, the main control unit 11 receives commands from a host computer system 8 via input/output electronics 12, interprets those commands, and controls the flow of data from the host. It also controls the flow of data internally within the storage unit (from the input section electronics 12 through an internal data buffer 13 (if included) to a write electronics 14, and controls the physical writing of the data on the medium 9. In the write electronics section 14, the data to be recorded is modified in special ways (encoded) to fit requirements of the recording media.

When reading data from the media, the main control unit 11, after receiving a command to read data from the host, reads data from the storage medium 9 through a read electronics 15 and the internal data buffer 13 (if any), and from the buffer 13 out to the host. The read electronics 15 performs necessary decoding of the read data to make it suitable for the host.

The main control unit 11 also controls servo electronics 16 for drive of the medium 9, as is well known in the art.

The actual design will vary between different devices. A more detailed design example of a prior art data storage device 10 called a streaming tape drive which is representative for the general system or device 10 described in FIG. 1 can be found in the TDC3600 service manual from Tandberg Data, incorporated herein by reference.

Hereafter, reference will be made mainly to tape drives, although the invention is suitable for any type of data storage device having a removable medium.

The main control unit 11 typically contains a special control program stored in a memory which controls the execution of the whole storage device 10 or part of it. In general, this control program or programs controls the operation of one or more of the built-in (micro-) processors. These programs are often stored in ROM (Read Only Memory) or EPROM (Erasable ROM), although designs also exist where the control program is stored in some form of volatile memory like RAM (Random Access Memory) (Both DRAM (Dynamic RAM) and SRAM (Static RAM)) or non-volatile memory which can be electrically erased like EEPROM (Electrical Erasable ROM) or Flash Memory (which is also a special form of electrical erasable and programmable memory).

Generally, the control programs are stored in the storage device at the time of manufacturing. This can be done by programming, for example in an EPROM, and then mounting the EPROM in the control unit. It is also possible to design microprocessors with the control program or at least a part of it embedded into the processor itself.

FIG. 2 shows a typical prior art design main control unit 11 having a microprocessor 17 and a control program stored in an EPROM 18 or ROM in the control unit 11. The microprocessor 17 calls its control information from the EPROM 18, and executes the commands according to the stored program. For every address sent by the microprocessor to the EPROM, the EPROM returns "Data" which gives the microprocessor the necessary instructions about the next step it shall perform.

Of course, the main control program storage may not necessarily be considered to be part of what is hereinafter called the "main control unit" but could be considered separate therefrom In the past, some data terminals have been designed in such a way that their internal control program (or a part of it) could be transferred from the host to a terminal over the cable connecting the two units (downloadable code). In principle, the same method could be used for data storage units. The host could transfer the whole control program or a part of it on a cable connecting the two units. The program could then be stored in a RAM, EEPROM, or Flash Memory. This would make it possible to upgrade storage devices in the field. Up to now, such methods have not been used extensively for data storage devices. The main reason is that very often the control programs are very complex and large, and it is time consuming and sometimes difficult to transfer such programs by this method.

At the same time, storing the control programs once and for all in an EPROM or similar unit has drawbacks, since it is very expensive and sometimes difficult to upgrade the control program, especially when the storage unit is placed in a data system at a user site.

SUMMARY OF THE INVENTION

It is an object of the present invention to provide flexibility in storage devices such that it is not necessary to store a specific control program for a specific medium for reading and writing from and to an associated storage medium.

It is another object of the invention to provide a data storage device or system by which control programs for reading and writing data from a storage medium associated therewith can be easily updated or upgraded.

It is another object of the invention to provide a storage device which can be operated with a variety of storage media having different types of control operations associated therewith.

It is another object of the invention to provide a data storage device which can be operated partly or completely independent of a host system when operating a control program for reading and writing data from an associated storage medium.

It is an additional object of the invention to provide a control program in a data storage device which may be upgraded with little or no control from the host system.

According to the invention, a new control program is loaded from the data storage medium itself, for example a tape cartridge. Thus, the data storage system having removable media according to the invention is equipped to download a control program directly from the media associated with the system. In this way, the control program in the data storage device may be upgraded with little or no control from the host system. In fact, the data storage device does not even have to be connected to the host.

According to the invention, a data storage device utilizes a removable storage media and has internally a main control unit comprising a processor, and a stored so-called "boot" program. The device is designed so that an internal control program for a media may be replaced or updated by reading a new control program (or a part of a program) from data stored in the medium itself by use of the "boot" program. The control program for the medium is stored in a programmable (and erasable) control memory device like a DRAM, a SRAM, an EEPROM, or a flash memory.

DESCRIPTION OF THE PREFERRED EMBODIMENTS

Figure 1:
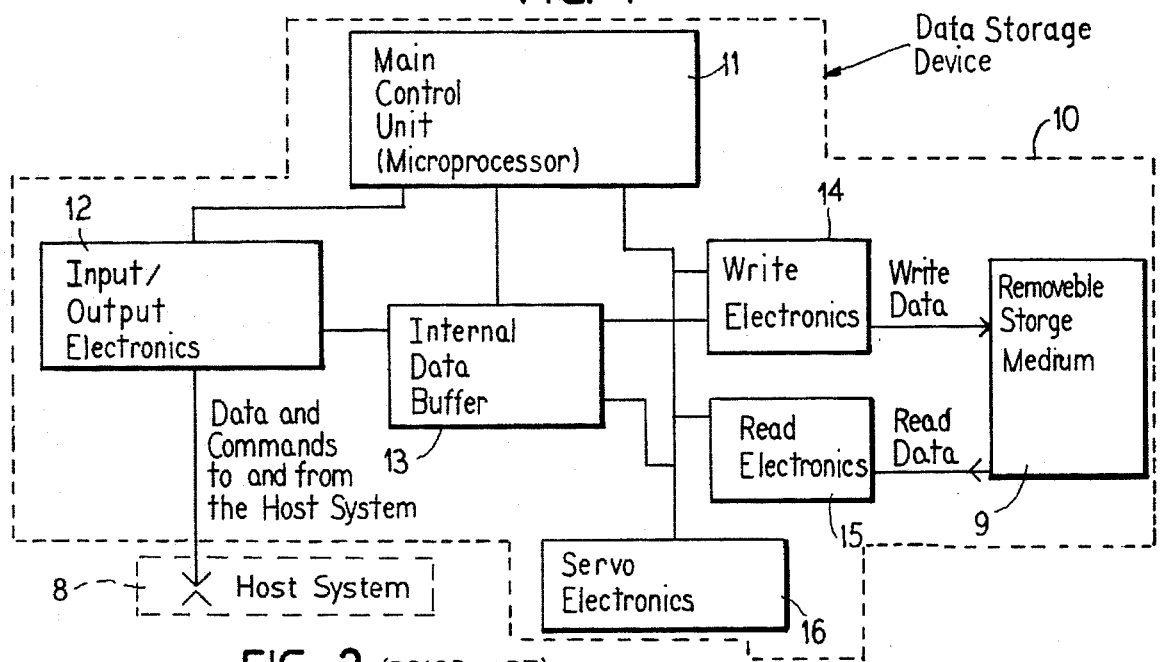
FIG. 1 is a block diagram showing a typical prior art data storage system for reading and writing data from and to an associated medium.
Figure 2:
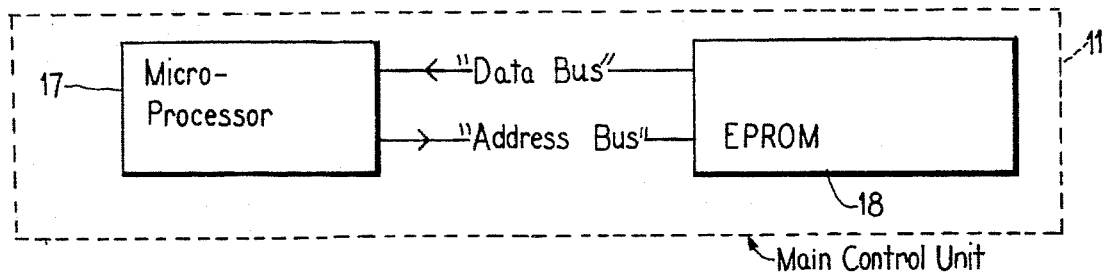
FIG. 2 is a block diagram of a prior art microprocessor in a system like FIG. 1 where a control program for the medium is stored in an EPROM.
Figure 3:
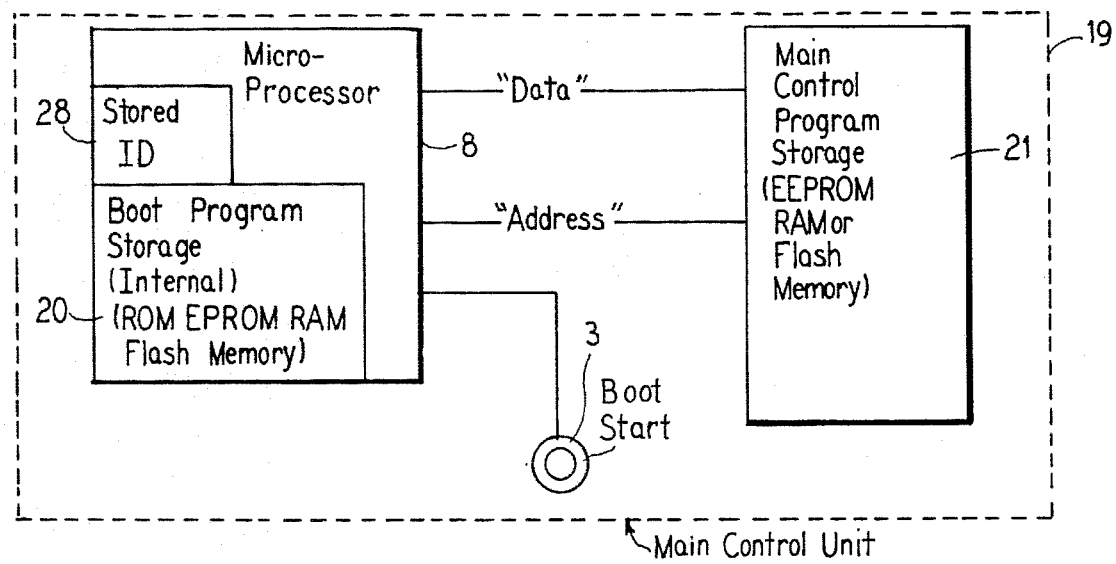
FIG. 3 is a block diagram of the data storage system of the invention having a removable media and which is equipped to download a control program from the media.

The basic organization of the main control unit 19 in the data storage system of the invention is shown in FIG. 3. In practice, any number of processors 8 in the control unit 19 may be given a new control program by the system and method of the invention.

With the invention, the microprocessor has a special control program already available to it in order to be able to load the new control program from the storage media. This will be described hereafter.

Figure 4:
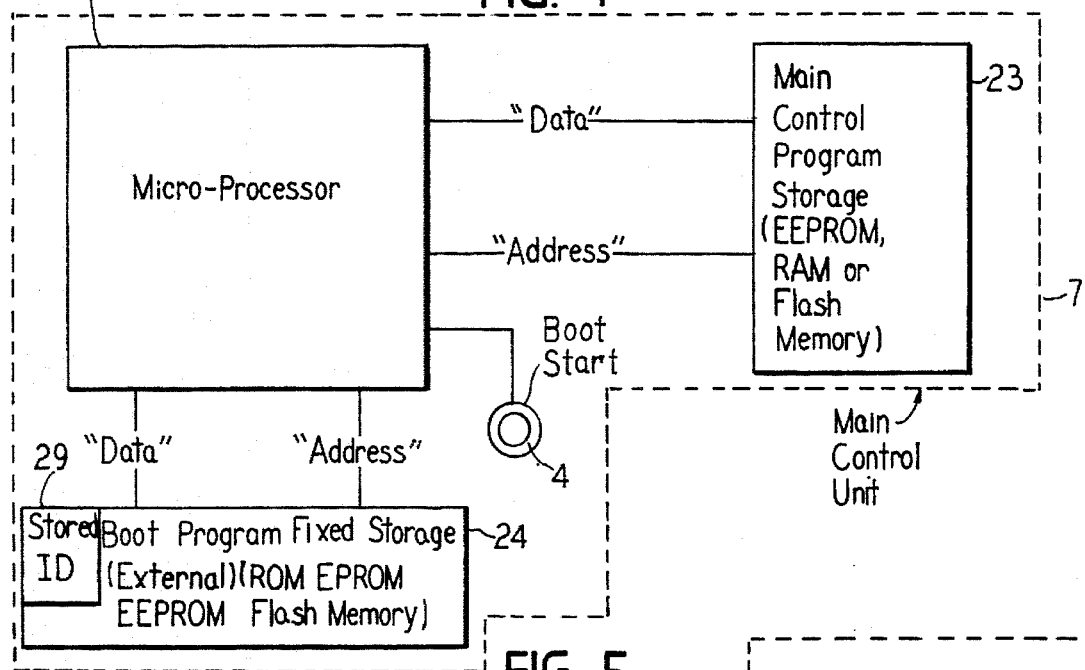
FIG. 4 is a block diagram of an alternate embodiment of the invention.
Figure 5:
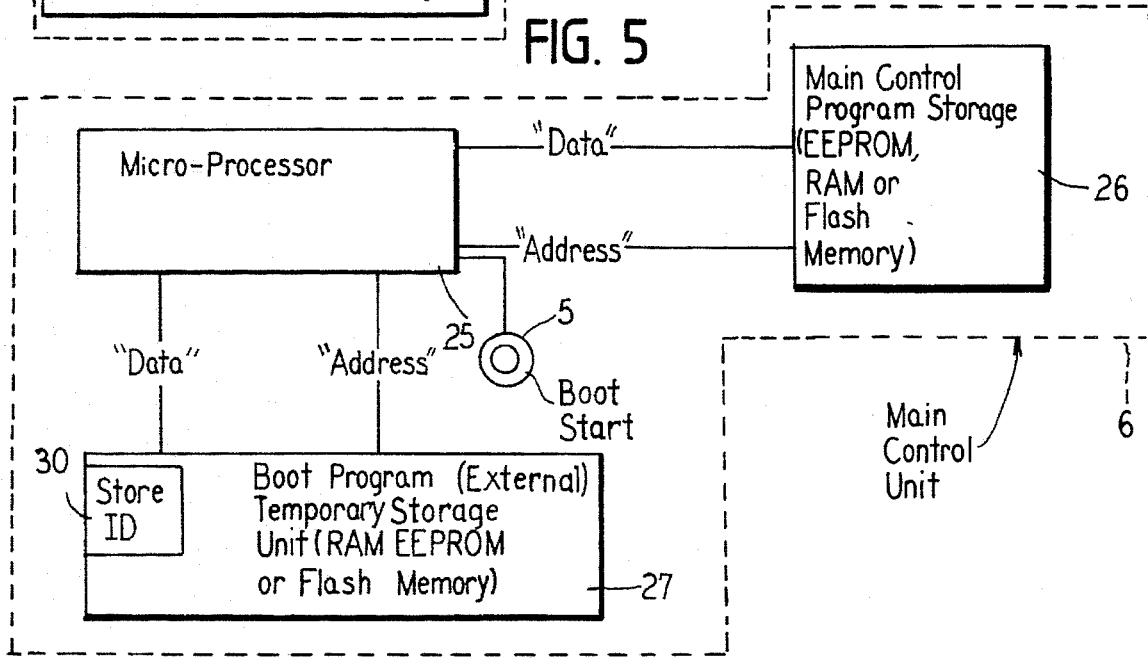
FIG. 5 is a block diagram of a further embodiment of the invention.
Figure 6:
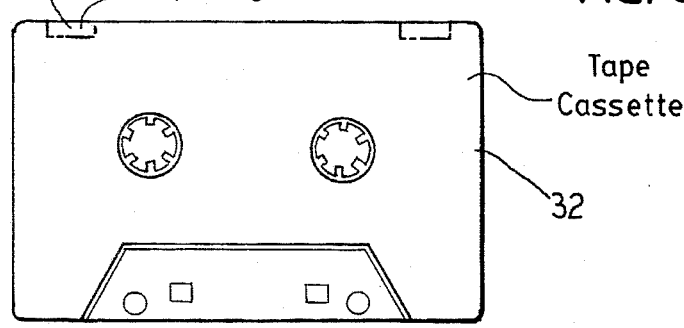
FIG. 6 is an illustration of a tape cassette having a physical opening for sensing by the drive unit of the data storage system so as to initiate a booting program according to the invention.

The control unit 19 has a microprocessor 8 which contains a special program ("boot program") stored either internally in the microprocessor 8 itself as shown in FIG. 3 with the program being stored in ROM, EPROM, RAM or Flash Memory 20 or in a special external storage device (Boot Storage 24) connected to the processor 22 in a main control unit, as shown in FIG. 4, like a ROM, EPROM, EEPROM, Flash Memory, or the equivalent. This boot program is designed to execute the loading (reading) of data from the data storage medium into the main control program storage device (21 in FIG. 3 or 23 in FIG. 4), which can be an EEPROM, RAM, a Flash Memory or a similar device capable of storing the control program. The boot program may be started on command from the host (if connected), by a boot start activator on the storage device (like a push button 3, 4, or 5 as shown in FIGS. 3, 4, and 5) or by inserting a special storage media which directly informs the drive's boot program to start booting, for example a special tape cartridge with a physical difference from a standard media (like an opening or an extra pin, etc. as shown at 31 of the tape cassette 32 shown in FIG. 6). This special physical difference (for example a pin or opening) initiates the booting program by pressing an internal button or equivalent. It is also possible to use standard storage media with no physical differences, for example on the tape cartridge itself, but which has a special data recording stored on the media which when read by the data storage device, initiates the booting operation. In a further embodiment of the invention as shown in FIG. 5, when informed either by a command from the host, by an external triggering like a push button 5 (either initiated by the operator or activated by a special cartridge or storage media such as shown in FIG. 6) or by reading special information recorded on the storage media which contains information that a new control program shall be loaded, the microprocessor 25 in the main control unit 6 transfers its current control program or a part of it (the "boot part") to a temporary storage device 27 like a RAM (DRAM or SRAM) or an EEPROM or Flash Memory. The microprocessor 25 then runs the boot program stored in this temporary device 27 and loads the new control program into the main control program storage 26. Thereafter, the new control program takes over.

Using the methods described above with respect to FIGS. 3, 4, and 5, the storage device has a removable media like a tape drive which permits easy upgrading of the internal control program by transferring a new program from a specially recorded tape (or media) to the internal control storage memory. This memory is of a type which allows erasing and storing of new data.

The loading of data for the first time is done by having a special boot program permanently stored in the microprocessor itself or by loading the boot program through other methods than from the media itself (for example, using a serial input channel to the microprocessor if available). Once the boot program is stored, the rest of the storage operation is then done from the reading of the media itself.

When a drive reads a cartridge containing a main control program which shall be loaded into the flash or EEPROM memory 21, 23, or 26, some sort of protection is needed to assure that the right program is loaded. It is also important to make sure that someone does not get hold of a control program designed for another person (for example, a competitor) and is able to load it into his own machine. For example, today it is known to have different control programs for almost every customer. The customers want something special which can make them different from their competitors. Therefore, it is known to provide tape drives having EPROMs with different contents, partly custom made for each particular customer. This is important since it is desirable to assure a company that customer is anxious that his or her control program shall not be given to other companies.

In the present invention, the drive equipped with means to download the control program from the drive media as described above (i.e., from a tape cartridge) has a protection built in to avoid that an incorrect control program is loaded. Such a protection can be made in many ways. In general, the drive and its associated main control unit is equipped with a special ID, which can be a unique number, letters, etc., which are permanently stored in the drive, for example inside the microprocessor as shown at 28, in FIG. 3 or at 29 in the boot program fixed storage 24 as shown in FIG. 4; or at 30 as shown in the boot program temporary storage 27 in FIG. 5. When a control program load operation takes place, the drive first makes a check to see that its internal ID matches the ID of the control program to be loaded. If so, the program may be loaded, if not, the drive will refuse to load.

In a further enhancement of this ID system, more than one customer control programs can be stored on the cartridge. The drive then sees the program which matches its own ID and loads only that one.

Although various minor changes and modifications might be proposed by those skilled in the art, it will be understood that I wish to include within the claims of the patent warranted hereon all such changes and modifications as reasonably come within my contribution to the art.

I claim as my invention:

1. A system, comprising:

an independent host computer;

an independent data storage device separate from the independent host computer for sending and receiving data and commands to and from the independent host computer;

said data storage device receiving either a removable data storage medium containing data or a removable control program storage medium separate from said data storage medium and containing a control program for controlling the data storage device for reading the data from the storage medium independently of any control program operated by the host computer for reading the storage medium data, said control program storage medium and data storage medium each having a housing for the respective medium, and the two housings being the same except for a physical identifying feature on the housing for the control program storage medium which can be sensed by the data storage device when the control program storage medium is inserted into the data storage device;

said data storage device having a microprocessor control unit separate from the host computer having a storage for programmable and erasable storage of said control program and also having a boot program for reading said storage medium control program from said control program storage medium into said storage;

said control unit of said data storage device utilizing said boot program to read said control program into said storage and then utilizing said control program for reading data from said removable storage medium independently of the host computer; and said data storage device having means for sensing said feature on the housing of the control program storage medium and for causing the data storage device to initiate the boot program to read in the control program independently of and without any initiating commands from the host computer, and without operator intervention when the control program storage medium is inserted into the data storage device.

2. The system according to claim 1 wherein the control program storage medium and the removable data storage medium each comprise a tape, and the housing of each comprises a cartridge.

3. The system according to claim 1 wherein said control program on the control program storage medium has a recorded ID therein, wherein the control unit has a stored ID associated therewith, and wherein means is provided for comparing the stored ID of the control unit with the control program ID of the control program storage medium to determine whether they are the same, and if they are the same, then the boot program is free to load in the control program.

4. The system according to claim 1 wherein said identifying feature of said control program storage medium comprises a mechanically sensed physical difference in the shape of a portion of the housing of the control program storage medium with respect to the housing of the data storage medium.

5. The system according to claim 4 wherein the physical difference comprises an opening at one end of a cartridge containing the control program storage medium, and wherein said cartridge houses a tape medium.

* * * * *